March 11, 1969     W. O. WEBER     3,432,380
WINDOWED FOAM PACKAGE
Filed April 2, 1965
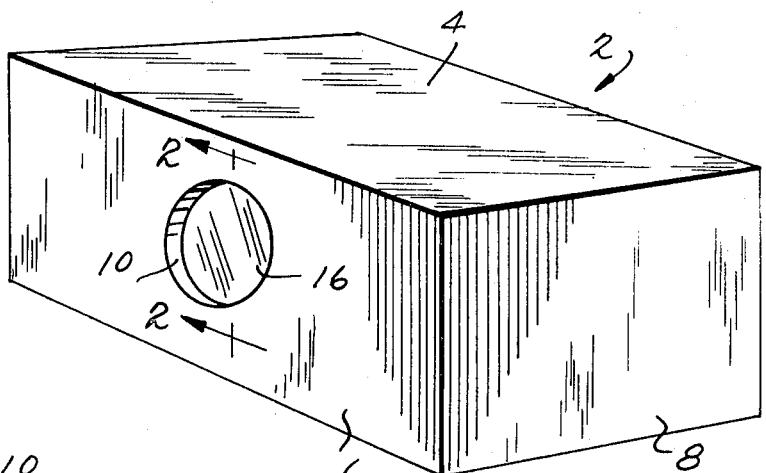
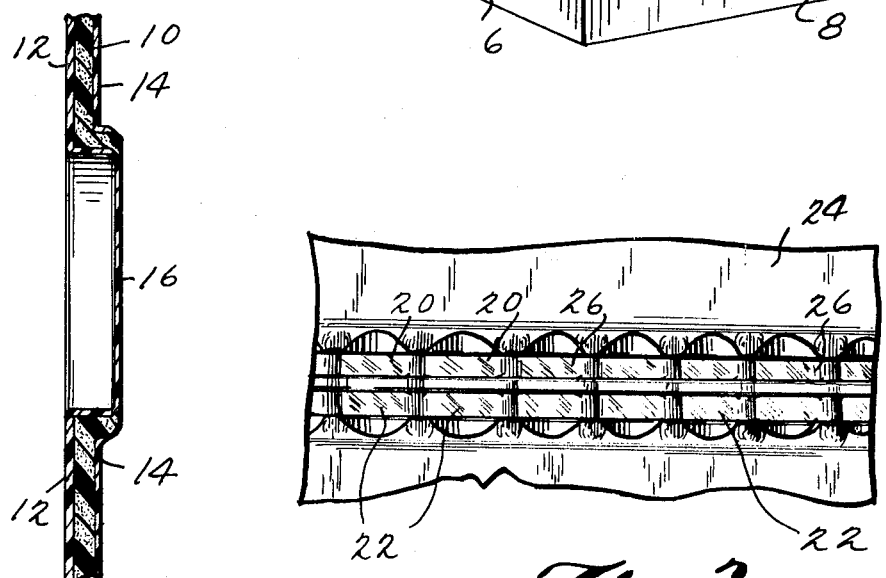
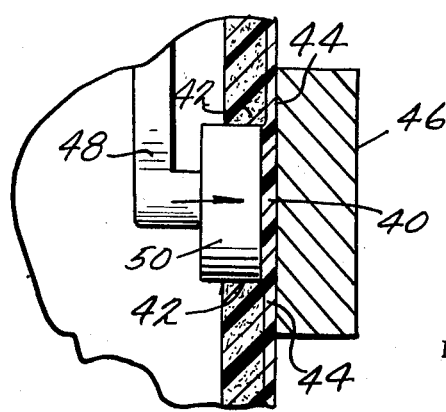
INVENTOR
WALTER O. WEBER
BY *Cushman, Darby & Cushman*
ATTORNEYS United States Patent Office 3,432,380
Patented Mar. 11, 1969

3,432,380
WINDOWED FOAM PACKAGE
Walter O. Weber, Newark, Del., assignor to Haveg Industries, Inc., Wilmington, Del., a corporation of Delaware
Filed Apr. 2, 1965, Ser. No. 445,122
U.S. Cl. 161—124            9 Claims
Int. Cl. B32b 3/00, 5/18

ABSTRACT OF THE DISCLOSURE

Foamed plastic containers having at least one transparent window are formed by compressing a portion of foamed wall of the container sufficient to increase the density of the foam to near that of the virgin plastic. The window is substantially thinner than the foam. Preferably, the compressing is done at a temperature of at least 150° F. and at a pressure of at least 500 p.s.i. Desirably, the foam has at least one external unfoamed nonporous skin of the polymer integral with the foam and it can have two external skins.

---

This invention relates to foamed polymers.

Foam packaging is a rapidly growing field. It is employed to package consumer items which normally have a visual appeal. Foam, because of its cellular structure is not transparent, nor completely translucent. In the packaging of certain items, e.g. a meat tray, it is advantageous to be able to see through the package.

Accordingly, it is an object of the present invention to prepare foam materials which can be seen through.

Another object is to prepare foam packages which have clear windows therein.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these ob'ects can be attained by compressing foam back to or near its original virgin density whereby it becomes clear or crystalline in nature and transparent. A package then can be made out of the foam material with window areas compressed where desired. Preferably the foam employed is one having an unfoamed skin so that the finished product will have increased strength.

The polymer mixture employed to make the foam should be consolute and substantially free from insoluble additives or additives with a markedly different index of refraction from that of the polymer.

In making the foamed articles of the present invention there can be employed many different types of foamed plastics.

When employing polystyrene there can be employed normal crystal grade polystyrene or high impact polystyrene or a mixture containing 5 to 95% normal crystal grade polystyrene and the balance high impact polystyrenes. When employing a thermoplastic styrene polymer it normally contains greater than 50% by weight of styrene and preferably at least 70% by weight of styrene in its structure. Preferably, the polystyrene is at least 10% high impact polystyrene. High impact polystyrenes are frequently prepared by polymerizing monomeric styrene in the presence of 2 to 15% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 95% polystyrene and 5% polyisoprene, a blend of 98% polystyrene with 2% rubbery butadiene-styrene copolymer, a blend of 85% polystyrene with 15% rubbery butadiene-styrene copolymer, and a copolymer of 99.5% styrene and 0.5% divinyl benzene.

Unless otherwise indicated, all parts and percentages are by weight.

Other suitable thermoplastic resins and polymers include chlorinated rubber, cellulose ethers and esters, e.g., ethyl cellulose, cellulose acetate, cellulose acetate-butyrate, paraffin wax, homopolymers and interpolymers of monomeric compounds containing the $CH_2=C$ grouping, such as olefins, e.g., ethylene, propylene, isobutylene, butene-1, vinyl halides, e.g., vinyl chloride and vinyl fluoride, vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluoroethylene, tetrafluorethylene, hexafluoropropylene, unsaturated carboxylic acids and derivatives thereof, e.g., acrylic acid, methacrylic acid, methyl acrylate, methyl alpha chloracrylate, ethyl acrylate, methyl methacrylate, acrylamide, acrylonitrile, methacrylonitrile, and interpolymers of the above-mentioned vinylidine monomers with alpha, beta-unsaturated polycarboxylic acids and derivatives thereof, e.g., maleic anhydride, diethyl maleate, dibutyl fumarate, diallyl maleate, dipropyl maleate, etc. A preferred class of materials with which optimum results are obtained are rigid, relatively nonelastic, thermoplastic resins such as homopolymers and interpolymers of vinyl chloride, e.g., polyvinyl chloride, vinyl chloride-vinyl acetate copolymer (87:13), vinyl chloride-acrylontrile copolymer (80:20); homopolymers of vinylidene aromatic hydrocarbons and ring halogenated derivatives thereof, e.g., styrene, o-chlorostyrene,
p-chlorostyrene,
2,5-dichlorostyrene,
2,4-dichlorostyrene,
p-methylstyrene,
p-ethylstyrene,
alphamethylstyrene, vinyl naphthalene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile. As previously indicated, for many uses the most preferred resins are thermoplastic styrene polymers containing at least 70% by weight styrene in the structure.

Additional suitable thermoplastic resins include polycarbonates, e.g., the polymer from bisphenol A and diphenyl carbonate; polyoxymethylene (Delrin), oxymethylene-alkylene oxide copolymers, e.g., oxymethylene-ethylene oxide (95:5), polyurethanes, e.g., prepolymers from toluene diisocyanate and polypropylene glycol molecular weight 3000 or butanediol 1,4-adipic acid polyester; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylonitrile, and 20 to 60% styrene.

The present invention is of particular value in preparing foamed articles from polyethylene (of high density, e.g., 0.960, medium density, e.g., 0.935 or low density, e.g., 0.914), polypropylene, copolymers of ethylene and propoylene (e.g., 50:50 copolymer, 60:40 copolymer and 20:80 copolymer), regular or high impact polystyrene, acrylonitrile - butadiene-styrene terpolymer, polyvinyl chloride (preferably rigid polyvinyl chloride), copolymers of ethylene with minor amounts of alpha olefins having 4 to 10 carbon atoms such as butene-1 (e.g., 90:10 and 97.5:2.5) or octene-1 (96:4); terpolymers of ethylene, propylene and up to 5% of a nonconjugated polyolefin such as alloocimene, pentadiene-1,4 and dicyclopentadiene, e.g., a terpolymer of 60% ethylene, 39% propylene and 1% dicyclopentadiene or pentadiene 1,4.

There can also be prepared foamed articles from fluorocarbon polymers such as polytetrafluoroethylene, polyhexafluoropropylene and tetrafluoroethylene-hexafluoropropylene copolymer (e.g. 50:50).

In forming the foamed plastic, there is preferably utilized a nucleating agent, e.g., in an amount of from 0.02 to 10%, preferably 0.4 to 5% of the weight of the polymer.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid, glutaric acid and phthalic acid. In places of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts, e.g., Triton X–100 (t-octylphenol-ethylene oxide adduct having 10 ethylene oxide units in the molecule), sodium lauryl sulfate and sodium dodecylbenzene sulfonate. The wetting agent can be nonionic or anionic.

One mode of incorporating the foaming agent into the polymer is by premixing the pelletized, solid, thermoplastic polymer, e.g., high impact styrene polymer, with a minor amount of an absorbent having absorbed thereon a volatile liquid (i.e., the foaming agent) which is nonreactive with and which has not more than a slight solvent action on the polymer. The volatile liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1 to 15%, preferably 0.5 to 10% by weight of the polymer. The absorbent is an inert filler of large surface area but small particle size, e.g., 200 mesh or below.

At the volatile liquid there can be used aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, dichlorodifluoromethane, perchloroethylene, dichlorotetrafluoroethane, isopropyl chloride, carbon tetrachloride, monochlorotrifluoroethylene, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is nonreactive with the particular polymer employed. Usually, the amount of volatile liquid will be 0.1 to 15% by weight of the polymer to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free-flowing powder consisting of the low boiling solvent or semi-solvent adsorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of a screw extruder.

In stead of absorbing the volatile liquid on a filler, there can be employed conventional expansible thermoplastic materials such as expansible polystyrene containing 1 to 9% of one of the volatile liquids, e.g., Dow-Pelespan 101 (expansible polystyrene beads containing 6% pentane).

These skins can be formed by rapidly chilling the outer and inner surfaces of the sheet during the foaming operation. In this manner the still warm core is permitted to expand while the outer and inner surfaces are not. There are thus obtained nonporous, impervious tough skins integrally united to the foamed core. The chilling can be done with an air blast, an air-water mist, argon, helium, nitrogen or other inert fluid. Chilling is conventionally carried out with air or an air-water mist at a flow rate of 40 to 100 ft./sec. and at 0 to 100° F.

The thickness of the skinned foamed sheets is usually from 10 to 250 mils although they can be 1 inch or thicker.

When a skinned foamed polymer is employed, the foam portion is normally 50 to 94% of the total thickness of the skins and foam portion. Each skin is normally 3 to 25% of the total thickness of the skins and foam portion. If two skins are employed, they are usually of the same thickness but this is not critical, e.g., one skin can be twice as thick as the other.

The foams can have a density of 3 to 85% of the density of the unfoamed polymer but preferably have a density of 20 to 80% that of the unfoamed polymer.

The method of making the skinned foam polymer is not a part of the present invention and any suitable method can be used such as that in Tiffin, French Patent 1,393,599 or in Noland U.S. Patent 3,168,207.

The transparent or clear window can be formed during the main forming operation or, more preferably after the main forming operation. The main forming operation can be vacuum forming as in French Patent 1,393,599 of Tiffin or blow molding as in Noland U.S. Patent 3,168,207, or it can be an injection molding, casting or even compression molding.

The clear window is normally formed while the foamed product is still warm, e.g. 150° F. or preferably higher.

The clear windowed area normally is formed by a matched die type of compression molding simultaneously with or subsequent to the thermoforming or other forming of the object as a whole as previously stated. The pressure required for the formation of the window area is above 100 p.s.i. and normally is at least 500 p.s.i. It can be as high as 2,500 p.s.i. or higher, e.g. 10,000 p.s.i. and preferably is 900 to 1500 p.s.i. The pressure should be sufficient to increase the density of the foam to substantially that of the unfoamed material.

The temperature at which the compression to form a clear window would be carried out varies slightly depending upon the plastic employed. Typical examples are as follows:

| Material: | Temperature range, ° F. |
|---|---|
| Polystyrene | 190–230 |
| Low density polyethylene (0.914–0.92 density) | 190–230 |
| Linear polyethylene (0.95–0.96 density) | 210–250 |
| Polypropylene | 250–300 |
| Rigid polyvinyl chloride | 250–300 |

There is no practical limit on the window area but it is controlled by the size of the matched dies. The present invention can be employed to make lens shaped transparent sections using the Fresnel principle for larger or thicker lenses.

The clear windows can be as thin as 1 mil or less but usually are at least 3 mils thick and they can be 100 mils or more. Usually the window has a thickness which is not over 60% of the thickness of the foam prior to the compression.

This invention will be understood best in connection with the drawings wherein

FIGURE 1 is a perspective view showing a skinned foam box;

FIGURE 2 is a sectional view along the line 2—2 of FIGURE 1;

FIGURE 3 is a top view of another form of the invention; and

FIGURE 4 is a sectional view illustrating the formation of a window.

Referring more specifically to FIGURES 1 and 2 of the drawing, there is provided a box 2 having a top 4, front side 6 and right side 8. (The bottom, back and left side are not shown in the drawing.) The box is made of polystyrene. The polystyrene is composed of a foam core 10 integral with an inner skin 12 and an outer skin 14 of the polystyrene. The skins are unfoamed and are impervious and nonporous. The foamed core had a thickness of 50 mils and each skin was 5 mils. The clear window 16 is formed in front side 6 by compressing the window area of the foam between matched dies at a pressure of 1200 p.s.i. and at a temperature of 220° F. The sides of the box can be adhered together either by the aid of heat or by use of an adhesive.

A clear window can be formed in a foamed open cup, e.g., a vacuum formed cup from foamed polystyrene having a density of 32 lbs./cu. ft. and provided with integral inner and outer skins of unfoamed polystyrene. The foamed core was 40 mils thick and each skin was 4 mils thick. The window was formed in the wall of the cup by applying a pressure of 1000 p.s.i. at a temperature of 210° F. while the window area of the foam was retained between matched dies.

A similar clear window was obtained with a cup of high density polyethylene (density 0.96) having an inner nonporous impervious skin integral with an outer foam layer. The skin had a thickness of 5 mils and the foam layer a thickness of 45 mils and a density of 37 lbs./cu ft. The window was formed by using matched dies and a pressure of 1300 p.s.i. and a temperature of 240° F.

FIGURE 3 illustrates a form of the invention wherein two series of clear elongated windows 20 and 22 are formed in sheet 24 of foamed polystyrene having upper and lower integral unfoamed skins of the polystyrene. In between the clear windows are foamed portions indicated by the shade lines 26. In FIGURE 3 the windows and shade portions are in the form of a sinusoidal curve. The windows were formed on the foamed sheet by chain marks on a hot foamed polystyrene sheet as the chain passed over the sheet on a carrier plate. Such windows can be used for visual inspection of the contents of a package made from the sheet.

When the foamed sheet only has an unfoamed skin of the side thereof, the window or windows are preferably formed by compressing the sheet toward the side which has the skin, e.g. a back-up die is placed against the skin and pressure is applied by a mating die from the opposite side of the sheet to compress the foam and form the window as shown in FIGURE 4.

Thus, as shown in FIGURE 4, a clear unfoamed, transparent window 40 is formed in the wall of a foamed polypropylene cup. The cup wall is primarily in foamed condition as shown at 42. However, the foam portion 42 is integral with an unfoamed nonporous external skin 44. The cup wall as such, containing the foam and skin, can be formed in the manner described in Tiffin French Patent 1,393,599. The window is formed by positioning the cup in mold or die 46 and then inserting mold or die 48 which has a portion 50 mating with a portion of the die 46. As the die 48 is inserted in the direction of the arrow, the portion of the cup wall in front of it is compressed and the foam collapsed to form the clear window 40. The window 40, it will be observed, is somewhat thicker than the skin 44 since the window has the combined thickness of the skin plus the thickness of the compressed foam portion. Since the skin has substantially the density of the unfoamed polymer, it is not compressed significantly.

While normally the window formed in the present invention will be substantially water white, it can be colored if a dye is employed to color the foam. Of course, the dye should not be one which is opaque.

In contrast to the partially coalesced discrete particle open cell porous materials of Bechtold, the foams employed in the present invention are unitary, having been formed by foaming a preformed sheet, for example, rather than from partially coalescing discrete particles. The foams also, due to their method of formation, normally have closed cells fitted with gas rather than open cells as in Bechtold. The porous structure of Bechtold also does not have what is generally recognized as a foam structure and in fact Bechtold deliberately eliminates the possibility of forming a foam by deaerating his dispersions, e.g. in Examples V and VI.

The products of the present invention are particularly useful in forming containers, e.g., cups, bottles, boxes, buckets and bags having windows therein. The packages can be of any shape, e.g., square, rectangular, octagonal, spherical, tetrahydral, heaxgonal, cylindrical, etc.

Normally the area of the window or windows will be much smaller than the overall area of the foamed plastic.

The gas in the closed cells is eliminated during the compressing step e.g., it can pass through holes in the mold.

I claim:

1. A process of preparing a transparent window in a wall made of an opaque foamed thermoplastic polymer having gas-containing cells, said polymer being selected from the group consisting of styrene polymers, polymers of monoolefins having 2 to 3 carbon atoms and vinyl chloride polymers, comprising compressing a predetermined portion of said foam wall at a temperature above 150° F. and a pressure above 100 p.s.i., the combination of temperature and pressure selected being sufficient to raise the density of said predetermined wall portion to substantially that of the polymer per se and thereby eliminate the gas-containing cells to form a transparent window in said foamed wall.

2. A process according to claim 1 wherein the pressure is at least 500 p.s.i.

3. A process according to claim 1 wherein said foam wall has integral therewith at least one external unfoamed, nonporous skin of said thermoplastic having substantially the density of the polymer per se and wherein said process comprising compressing a predetermined portion of said foam wall against said skin to form said window.

4. A process according to claim 3 wherein there is a single external skin on said foam and said window has a thickness of at least 3 mils.

5. A process according to claim 4 wherein said polymer is a styrene polymer.

6. A container comprising wall means made of a thermoplastic polymer selected from the group consisting of styrene polymers, polymers of monoolefins having 2 to 3 carbon atoms and vinyl chloride polymers, the major portion of said wall means being in the form of a foam layer with at least one external unfoamed, nonporous skin of said polymer integral with said foam and at least one transparent window of said polymer in unfoamed condition in said wall means and integral with said foam and said skin, said window being thicker than said skin but being substantially thinner than the combined thickness of the foam and skin, and having a density which is substantially higher than that of said foam and is near the virgin density of the polymer, said foam being 50 to 97% of the total thickness of the foam and skin.

7. A container according to claim 6 wherein there is a skin on one side of said wall only and the window has a thickness of at least 3 mils.

8. A container according to claim 7 wherein the external side of the window is a continuation of the external surface of the foam wall.

9. A container according to claim 7 wherein the external side of the window is recessed in the foam wall.

References Cited

UNITED STATES PATENTS

| | | | |
|---|---|---|---|
| 3,017,987 | 1/1962 | Moslo | 206—45.31 |
| 3,159,698 | 12/1964 | Suh et al. | 220 |
| 3,170,832 | 2/1965 | Wilson et al. | 161 |
| 3,244,571 | 4/1966 | Weisman | 161 |
| 3,256,133 | 8/1966 | Wright et al. | 161—160 |
| 3,177,109 | 4/1965 | Ziegler | 161—161 |
| 3,256,131 | 6/1966 | Koch et al. | 161—124 |

MORRIS SUSSMAN, *Primary Examiner.*

U.S. Cl. X.R.

161—161, 409; 206—45.31; 220—82; 229—3.5; 264—48, 321